(12) United States Patent
Park

(10) Patent No.: US 10,656,749 B2
(45) Date of Patent: May 19, 2020

(54) DEVICE AND METHOD FOR FORMING IDENTIFICATION PATTERN FOR TOUCH SCREEN

(71) Applicant: 2GATHER INC., Seoul (KR)

(72) Inventor: Sang Jun Park, Seoul (KR)

(73) Assignee: 2GATHER INC., Seoul (KR)

( * ) Notice: Subject to any disclaimer, the term of this patent is extended or adjusted under 35 U.S.C. 154(b) by 0 days.

(21) Appl. No.: 15/109,572

(22) PCT Filed: Jan. 7, 2015

(86) PCT No.: PCT/KR2015/000133
§ 371 (c)(1),
(2) Date: Jul. 1, 2016

(87) PCT Pub. No.: WO2015/105325
PCT Pub. Date: Jul. 16, 2015

(65) Prior Publication Data
US 2016/0334920 A1    Nov. 17, 2016

(30) Foreign Application Priority Data
Jan. 9, 2014    (KR) .................. 10-2014-0002747

(51) Int. Cl.
| G06F 3/041 | (2006.01) |
| G06F 3/045 | (2006.01) |
| G06F 3/044 | (2006.01) |
| G06F 21/44 | (2013.01) |
| G06F 3/0488 | (2013.01) |
| G06F 21/73 | (2013.01) |

(52) U.S. Cl.
CPC ............ *G06F 3/0416* (2013.01); *G06F 3/044* (2013.01); *G06F 3/045* (2013.01); *G06F 3/04883* (2013.01); *G06F 21/44* (2013.01); *G06F 21/73* (2013.01); *G06F 2203/04104* (2013.01)

(58) Field of Classification Search
None
See application file for complete search history.

(56) References Cited

U.S. PATENT DOCUMENTS

| 2005/0050023 A1* | 3/2005 | Gosse ............... G06F 16/951 |
| 2009/0167727 A1* | 7/2009 | Liu .................. G06F 3/03545 |
| | | 345/179 |

(Continued)

FOREIGN PATENT DOCUMENTS

| CN | 101859226 A | 10/2010 |
| CN | 102184043 A | 9/2011 |

(Continued)

OTHER PUBLICATIONS

International Search Report issued in corresponding International Application No. PCT/KR2015/00133 dated Apr. 20, 2015, 5 pages.

*Primary Examiner* — Patrick N Edouard
*Assistant Examiner* — Peijie Shen
(74) *Attorney, Agent, or Firm* — Snyder, Clark, Lesch & Chung, LLP

(57) ABSTRACT

Disclosed is a method of forming an identification pattern for a touchscreen. The method comprising: (a) defining a touch region by touching a region forming point on a touchscreen; and (b) forming an identification pattern by touching an identification pattern point in the touch region.

15 Claims, 7 Drawing Sheets

(56) References Cited

U.S. PATENT DOCUMENTS

| | | | |
|---|---|---|---|
| 2010/0026642 A1* | 2/2010 | Kim | G06F 3/0416 345/173 |
| 2010/0262591 A1* | 10/2010 | Lee | G06F 3/04883 707/706 |
| 2011/0231796 A1* | 9/2011 | Vigil | G06F 3/04883 715/810 |
| 2011/0244924 A1* | 10/2011 | Jung | G06F 3/04855 455/566 |
| 2012/0050184 A1* | 3/2012 | Yoo | G06F 3/038 345/173 |
| 2012/0169632 A1 | 7/2012 | Yu | |
| 2012/0287063 A1* | 11/2012 | Chen | G06F 3/0488 345/173 |
| 2013/0194202 A1 | 8/2013 | Moberg et al. | |
| 2013/0222337 A1 | 8/2013 | Lee | |
| 2013/0234997 A1* | 9/2013 | Miyokawa | G06F 3/0418 345/178 |
| 2014/0002417 A1* | 1/2014 | Yoshida | G06F 3/044 345/174 |
| 2014/0032346 A1* | 1/2014 | Hong | G06Q 20/20 705/18 |
| 2014/0098073 A1* | 4/2014 | Singh | G06F 1/3231 345/179 |
| 2014/0259150 A1* | 9/2014 | Lee | G06F 21/36 726/16 |
| 2014/0362007 A1* | 12/2014 | Jung | G06F 3/04883 345/173 |
| 2015/0128255 A1* | 5/2015 | Kuscher | G06F 21/32 726/19 |
| 2015/0130737 A1* | 5/2015 | Im | G06F 1/3265 345/173 |
| 2015/0148121 A1* | 5/2015 | Hirai | A63F 13/235 463/29 |

FOREIGN PATENT DOCUMENTS

| | | |
|---|---|---|
| JP | 2012256246 A | 12/2012 |
| JP | 2013012057 A | 1/2013 |
| JP | 2013089013 A | 5/2013 |
| JP | 2013168187 A | 8/2013 |
| KR | 10-0984152 B1 | 9/2010 |
| KR | 10-2012-0078396 A | 7/2012 |
| KR | 10-2013-0065331 A | 6/2013 |
| KR | 10-2013-0099420 A | 6/2013 |
| KR | 10-2013-0108687 A | 10/2013 |
| TW | 200928887 A | 7/2009 |

* cited by examiner

[FIG. 1]
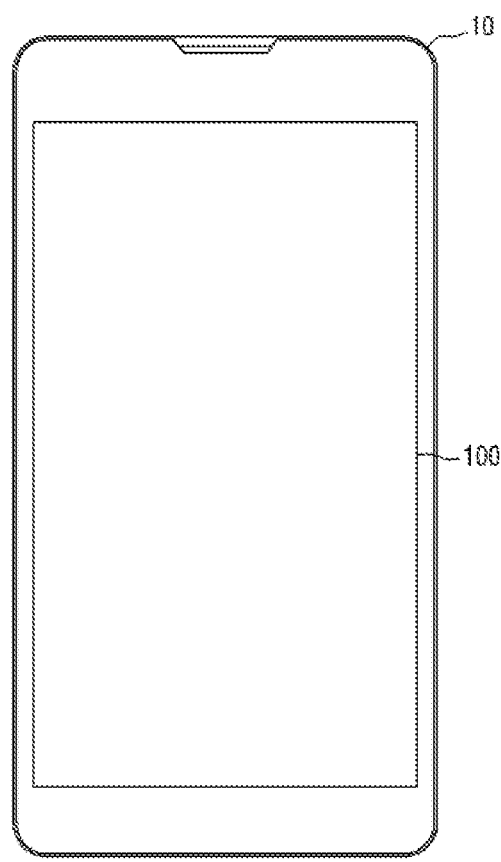

[FIG. 2]
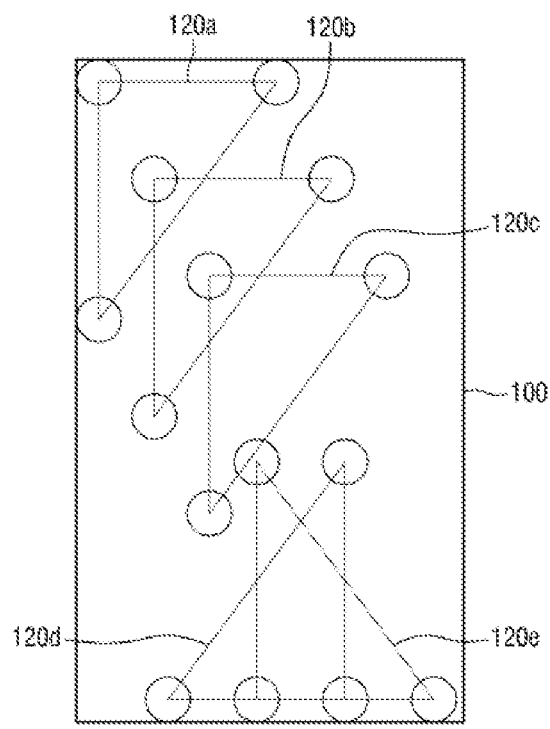

[FIG. 3]
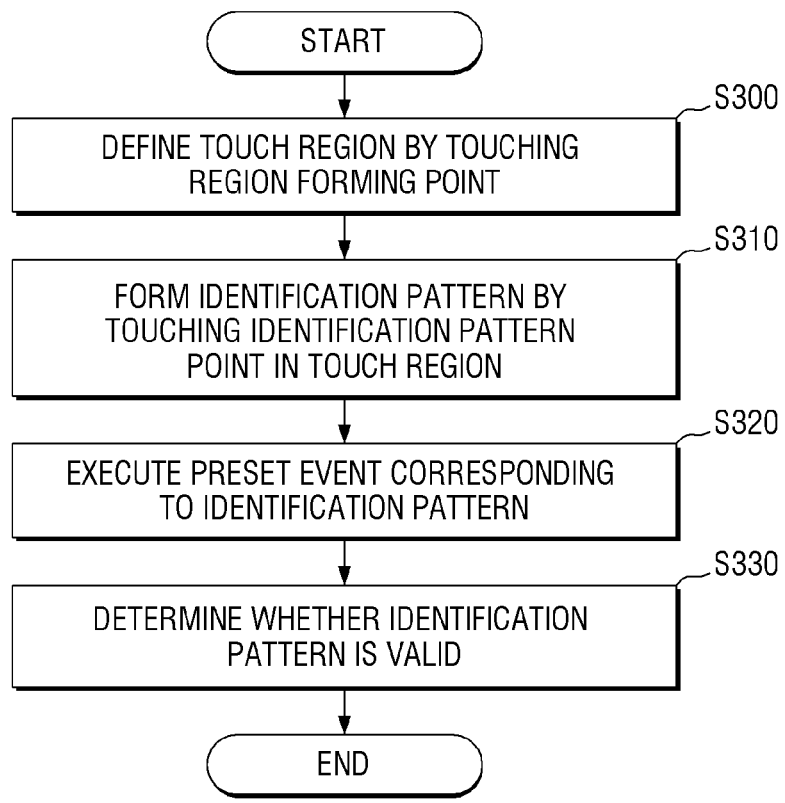

[FIG. 4]
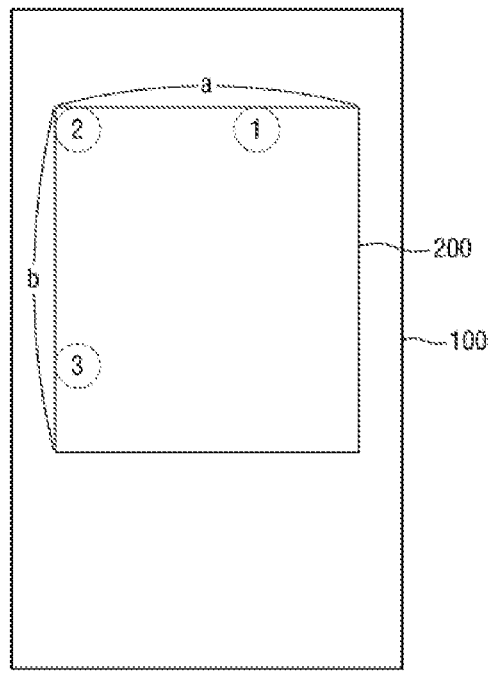
[FIG. 5]
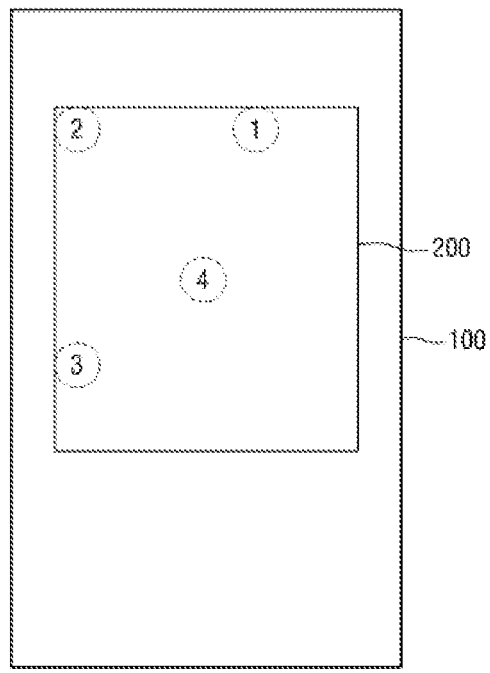

[FIG. 6]
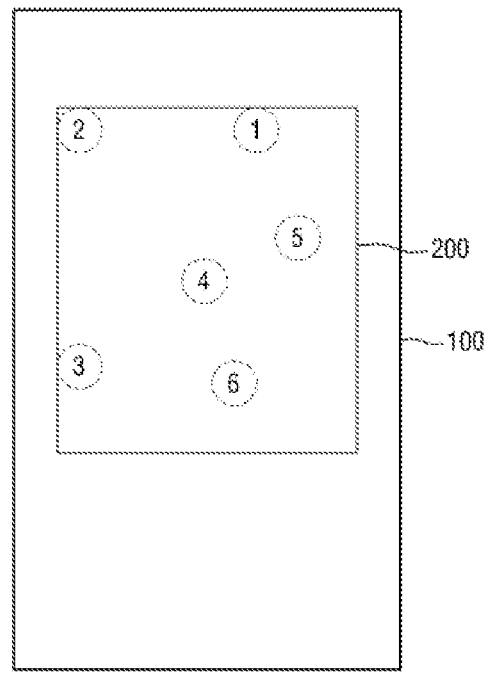
[FIG. 7]
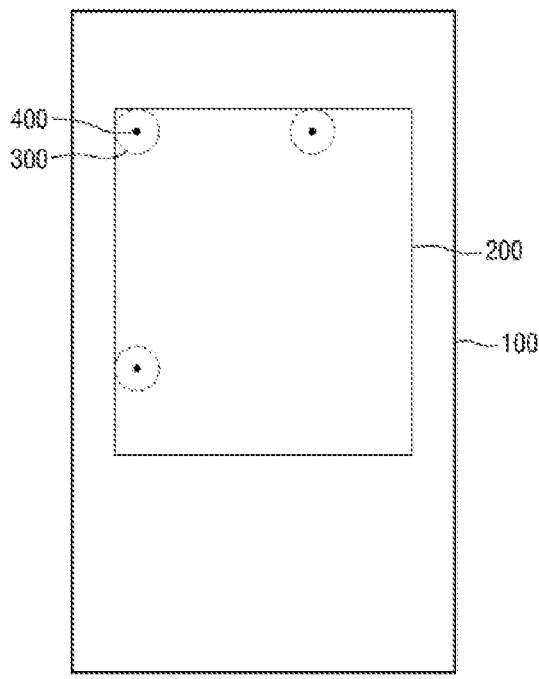

[FIG. 8]
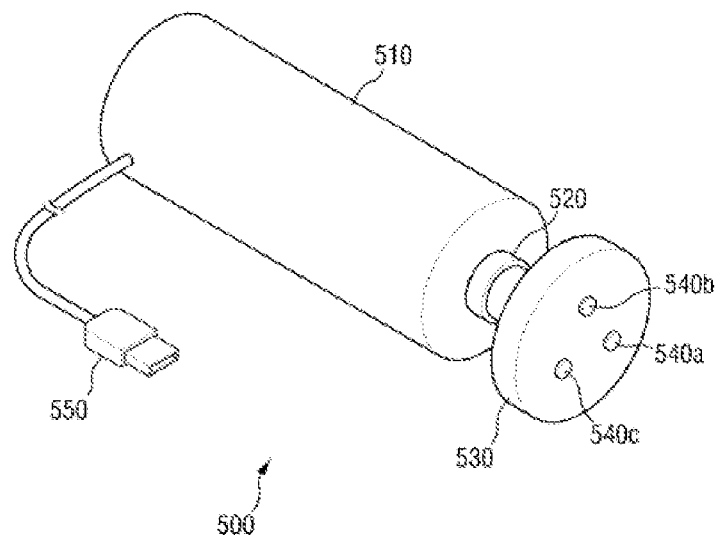
[FIG. 9]
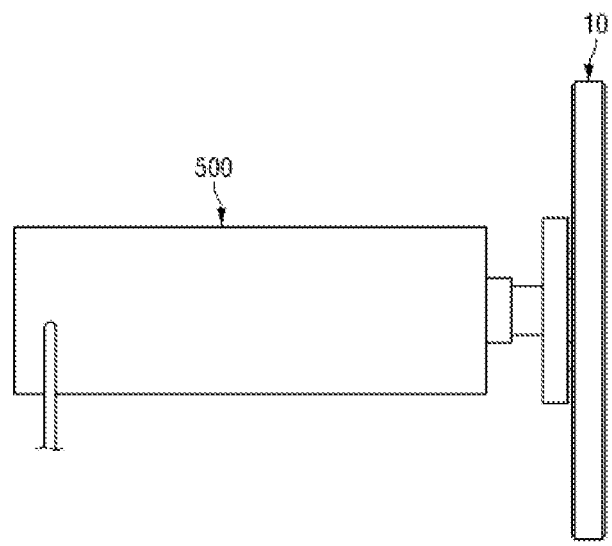

[FIG. 10]
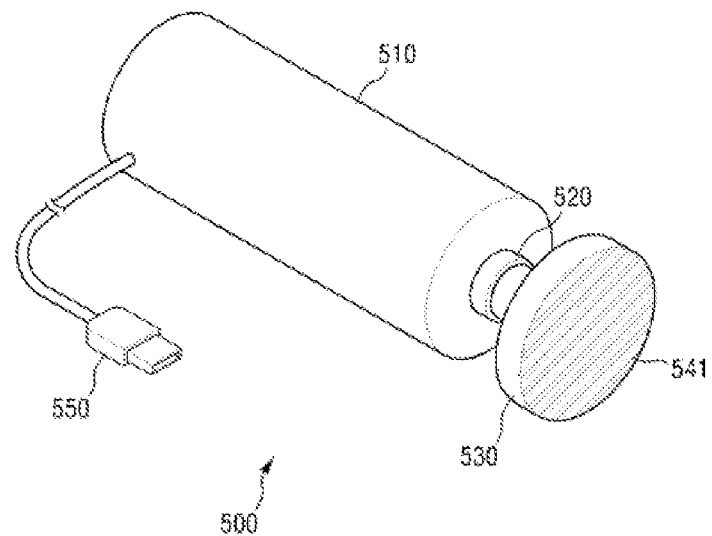
[FIG. 11]
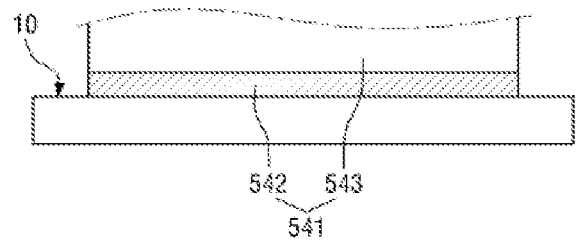

DEVICE AND METHOD FOR FORMING IDENTIFICATION PATTERN FOR TOUCH SCREEN

CROSS-REFERENCE TO RELATED APPLICATIONS

This application claims the benefit under 35 U.S.C. § 371 of International Application No. PCT/KR2015/000133, filed on Jan. 7, 2015, which claims priority to Korean Application No. 10-2014-0002747 filed on Jan. 9, 2014. All of these applications are incorporated by reference herein.

TECHNICAL FIELD

The present invention relates to an apparatus and method for forming an identification pattern for a touchscreen.

BACKGROUND ART

A capacitive touchscreen has a function called multi-touch. When multiple points on the touchscreen are touched simultaneously, multi-touch enables the touchscreen to recognize the points simultaneously. If multi-touch is used, various patterns formed using multi-touched points can be input to an electronic device such as a smartphone. Of the various patterns, only different types of patterns that are distinguished from each other can be used as identification marks.

However, the number of points that can be multi-touched is limited due to technological limitations. For example, multi-touch of a particular smartphone can recognize only about 2 to 5 points. The number of multi-touches may be more limited when a particular program screen, for example, a web browser is used. Therefore, the number of types of identification marks is limited. Accordingly, there are limitations in identifying more than a certain number of users or places using multi-touch based identification patterns. This has led to a need for a way to overcome limitations of an identification method using a multi-touch pattern.

CITATION LIST

Patent Literature

Korean Patent Publication No. 10-2012-0030308

DISCLOSURE

Technical Problem

Aspects of the present invention provide a method of forming more various identification patterns for touchscreens.

Aspects of the present invention also provide an apparatus for forming more various identification patterns for touchscreens.

However, aspects of the present invention are not restricted to the one set forth herein. The above and other aspects of the present invention will become more apparent to one of ordinary skill in the art to which the present invention pertains by referencing the detailed description of the present invention given below.

Technical Solution

According to an aspect of the present invention provides method of forming an identification pattern for a touchscreen, the method comprising (a) defining a touch region by touching a region forming point on a touchscreen; and (b) forming an identification pattern by touching an identification pattern point in the touch region According to an aspect of the present invention, wherein the region forming point is provided in a plurality, and the identification pattern point is touched sequentially to define the touch region in the step (a).

According to an aspect of the present invention, wherein the region forming points are touched sequentially at regular time intervals or simultaneously.

According to an aspect of the present invention, wherein the touch region is shaped like a convex n-gon, where n is a natural number of 3 or more.

According to an aspect of the present invention, the method further comprising: (c) applying the formed identification pattern and executing a preset event corresponding to the identification pattern; and (d) determining whether the identification pattern is valid.

According to an aspect of the present invention, wherein the step (d) comprises: transmitting time information or position information to a server; and determining whether the identification pattern is valid using the server based on the time information or the position information.

According to an aspect of the present invention, wherein the preset event is to make the touchscreen located at a place corresponding to the identification pattern.

According to an aspect of the present invention, wherein the region forming point and the identification pattern point are touched at different locations.

According to an another aspect of the present invention provides apparatus for forming an identification pattern for a touchscreen, the apparatus comprising: a handle which can be held by a user with a hand; and a touchscreen touching unit which is connected to the handle and transmits an electrical or physical signal to a touchscreen, wherein the touchscreen touching unit defines a touch region by touching a region forming point on the touchscreen and forms an identification pattern by touching an identification pattern point in the touch region.

According to an aspect of the present invention, wherein the handle is made of a conductive material, and the touchscreen touching unit transmits the electrical signal using static electricity of the hand of the user.

According to an aspect of the present invention, further comprising a power supply unit which supplies power to the touchscreen touching unit.

According to an aspect of the present invention, wherein the identification pattern is used to identify different places.

Advantageous Effects

The present invention can form far more various identification patterns than conventional identification patterns.

In addition, the present invention can be used not only in multi-touch enabled capacitive touchscreens but also in other types of multi-touch disabled touchscreens and in environments, such as a web browser, in which multi-touch is limited.

Furthermore, the present invention can sense an event corresponding to each identification mark.

However, the effects of the present invention are not restricted to the one set forth herein. The above and other effects of the present invention will become more apparent to one of daily skill in the art to which the present invention pertains by referencing the claims.

DESCRIPTION OF DRAWINGS

The above and other aspects and features of the present invention will become more apparent by describing in detail exemplary embodiments thereof with reference to the attached drawings, in which:

FIG. 1 illustrates an example smartphone including a touchscreen on which a method of forming an identification pattern for a touchscreen according to an embodiment of the present invention is used;

FIG. 2 illustrates example patterns formed using a conventional multi-touch method;

FIG. 3 is a flowchart illustrating a method of forming an identification pattern for a touchscreen according to an embodiment of the present invention;

FIGS. 4 through 6 illustrate operations of the method of forming an identification pattern for a touchscreen according to the embodiment of the present invention;

FIG. 7 illustrates a method of forming an identification pattern for a touchscreen according to another embodiment of the present invention;

FIG. 8 is a perspective view of an apparatus for forming an identification pattern for a touchscreen according to an embodiment of the present invention;

FIG. 9 is a side view illustrating a touch action of the apparatus for forming an identification pattern for a touchscreen according to the embodiment of the present invention;

FIG. 10 is a perspective view of an apparatus for forming an identification pattern for a touchscreen according to another embodiment of the present invention; and FIG. 11 is an enlarged side view illustrating, in detail, a touchscreen touching unit of FIG. 10.

MODE FOR INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, it will be understood that the singular forms are intended to include the plural forms as well. It will be further understood that the terms "comprises" and/or "comprising," when used in this specification, specify the presence of stated features, integers, steps, operations, elements, and/or components, but do not preclude the presence or addition of one or more other features, operations, elements, and/or components thereof.

A touchscreen on which a method of forming an identification pattern for a touchscreen according to an embodiment of the present invention is used will now be described with reference to FIG. 1.

FIG. 1 illustrates an example smartphone including a touchscreen on which a method of forming an identification pattern for a touchscreen according to an embodiment of the present invention is used.

Referring to FIG. 1, a smartphone 10 includes a touchscreen 100.

The method of forming an identification pattern for a touchscreen according to the embodiment of the present invention can be used on the touchscreen 100. The method of the present invention can be used not only in smartphones but also in any electronic device including the touchscreen 100. For example, the method of the present invention can be used in a tablet PC if the table PC includes the touchscreen 100.

The touchscreen 100 may be a capacitive touchscreen. However, the touchscreen 100 is not limited to the capacitive touchscreen and may also be a resistive touchscreen. The capacitive touchscreen detects a touch using the static electricity and electric current of a human body, and the resistive touchscreen detects a touch by sensing pressure.

In a conventional resistive touchscreen, it is relatively not easy to implement multi-touch or plural touch. Thus, it may be difficult to form an identification pattern using multi-touch or plural touch. However, the method of forming an identification pattern for a touchscreen according to the embodiment of the present invention uses sequential touch instead of multi-touch. Therefore, the method of forming an identification pattern for a touchscreen according to the embodiment of the present invention can be used not only in capacitive touchscreens but also in resistive touchscreens. A conventional method of forming an identification pattern using multi-touch will now be described with reference to FIG. 2.

FIG. 2 illustrates example patterns formed using a conventional multi-touch method.

In the conventional method, a plurality of points on a touchscreen 100 can be touched simultaneously. For example, 3 points can be touched as illustrated in the drawing. It is assumed that the touchscreen 100 has a space in which 10 by 10 points can be touched. That is, it is assumed that the touchscreen 100 is a square with 100 (=10×10) touch points.

Since a first pattern 120a has three points, three points may be determined based on 970,200 (=100×99×98). If the first pattern 120a has four points, more cases (i.e., 94,109,400 (=100×99×98×97) cases) than when the first pattern 120a has three points may be generated.

However, patterns such as a second pattern 120b and a third pattern 120c which are different only in position should be recognized as the same pattern. In addition, patterns such as a fourth pattern 120d and a fifth pattern 120e which are rotated versions of each other should be recognized as the same pattern. If the number of cases where patterns are recognized as the same pattern is excluded, the number of actually identified patterns will be reduced significantly.

A method of forming an identification pattern for a touchscreen according to an embodiment of the present invention will now be described with reference to FIGS. 3 through 6.

FIG. 3 is a flowchart illustrating a method of forming an identification pattern for a touchscreen according to an embodiment of the present invention. FIGS. 4 through 6 illustrate operations of the method of forming an identification pattern for a touchscreen according to the embodiment of the present invention.

Referring to FIGS. 3 and 4, a touch region is defined by touching a region forming point (operation S300).

A region forming point (1, 2, 3) can be touched on a touchscreen 100. Specifically, the region forming point (1, 2, 3) can be touched on a touch point of the touchscreen 100. One region forming point (1, 2, 3) or a plurality of region forming points (1, 2, 3) can be provided. The number of region forming points (1, 2, 3) is not limited to a particular number as long as the region forming point (or points) (1, 2, 3) can define a touch region 200.

If a plurality of region forming points 1, 2 and 3 are provided, they can be touched sequentially. The sequence in which the region forming points 1, 2 and 3 are touched may vary according to the definition of the touch region 200. For example, when the touch region 200 is a quadrilateral as illustrated in the drawings, a second region forming point 2 may be preset as an upper left vertex. Therefore, the region forming points 1, 2 and 3 may be touched sequentially according to the preset condition to form the touch region 200. The region forming points 1, 2 and 3 may be touched sequentially. The region forming points 1, 2 and 3 may be touched sequentially at regular time intervals. The time intervals at which the region forming points 1, 2 and 3 are touched may be tiny time intervals. The region forming points 1, 2 and 3 may be touched by an apparatus 500 for forming an identification pattern for a touchscreen which will be described later. The apparatus 500 for forming an identification pattern for a touchscreen may sequentially touch the region forming points 1, 2 and 3 by automatically transmitting an electrical signal or a physical signal to the touchscreen.

The regular time intervals may be greater than a maximum time which the touchscreen is perceived as being touched simultaneously. This is because the region forming points 1, 2 and 3 should be perceived as being touched sequentially. The regular time intervals may be small enough to make a total touch time sufficiently short. The total touch time is the sum of time intervals between the region forming points 1, 2 and 3 and identification pattern points 4, 5 and 6. If the total touch time is excessively long, a user of the apparatus 500 for forming an identification pattern for a touchscreen may experience inconvenience, or an error may occur. Therefore, there should be an upper limit on the total touch time. The adjective "regular" in the regular time intervals is a concept encompassing a tiny time difference.

If the region forming points 1, 2 and 3 are touched sequentially instead of being multi-touched, the method of forming an identification pattern for a touchscreen according to the current embodiment can be applied not only to capacitive touchscreens in which multi-touch can be implemented relatively easily but also to other types of touchscreens.

Even in the case of capacitive touchscreens, while up to about five multi-touches can be implemented on a background screen or a screen that runs an application, only two or less touches can be recognized when, for example, a web browser is executed. That is, there may be software limitations on multi-touch. On the other hand, since the method of forming an identification pattern for a touchscreen according to the current embodiment uses sequential touch, it is free from software limitations.

However, the region forming points 1, 2 and 3 can also be touched simultaneously instead of sequentially. In the case of the multi-touch enabled touchscreen 100, the region forming points 1, 2 and 3 can be touched simultaneously. In this case, the number of the region forming points 1, 2 and 3 may be adjusted in advance according to the number of multi-touches allowed.

The touch region 200 may be defined by the region forming points 1, 2 and 3. The touch region 200 may be defined by the region forming points 1, 2 and 3 and a preset condition. The touch region 200 may be shaped like a plane figure on the touchscreen 100. For example, the touch region 200 may be shaped like a rectangle as illustrated in the drawings.

Even when the touch region 200 is shaped like a rectangle, the preset condition may be various. As illustrated in the drawings, a first region forming point 1 may be a point on an upper side of the rectangle, and the second region forming point 2 may be an upper left vertex of the rectangle. A third region forming point 3 may be a point on a left side of the rectangle. A length a of the upper side and a length b of the left side may be preset.

The condition for forming the rectangular touch region 200 is not limited to the above example. For example, three of the vertices of the rectangle can be designated as the region forming points 1, 2 and 3. In this case, however, the touch region 200 may become smaller than when the lengths a and b of the sides are preset. That is, in a method of forming the touch region 200 by touching the vertices, the lengths of the sides of the rectangle may be determined according to a distance between the region forming points 1, 2 and 3. On the other hand, in a method of forming the touch region 200 by presetting the lengths a and b of the sides, the touch region 200 may be defined as a rectangle with longer sides than the distance between the region forming points 1, 2 and 3. Here, the area of the touch region 200 is defined only within the touchscreen 100.

According to the method of forming the touch region 200 by selecting the lengths a and b of the sides, the same touch region 200 can be formed by touching any one touch point on the upper and left sides. In this case, the same touch region 200 can be set. However, even in this case, since the region forming points 1, 2 and 3 may have been touched differently, they may be recognized as different identification patterns. That is, the region forming points 1, 2 and 3 as well as the identification pattern points 4, 5 and 6 may be used to form a final identification pattern.

The shape of the touch region 200 is not limited to a particular shape. For example, the touch region 200 may be shaped like a convex n-gon, where n is a natural number of 3 or more. In this case, the number of the region forming points 1, 2 and 3 may vary according to n. That is, the number and sequence of the region forming points 1, 2 and 3 are not limited to a particular number and sequence as long as the touch region can be defined using the preset condition and the region forming points 1, 2 and 3.

The touch region 200 may also be shaped like a circle. In this case, the region forming points 1, 2 and 3 may be three or more different points on the circumference of the circle. Alternatively, the touch region 200 may be a circle with a preset radius around any one of the region forming points 1, 2 and 3.

As described in the various examples above, the touch region 200 can be freely defined according to the size and shape of the touchscreen 100 and the positions of the region forming points 1, 2 and 3.

Referring to FIGS. 3, 5 and 6, an identification pattern is formed by touching an identification pattern point in the touch region (operation S310).

An identification pattern point (4, 5, 6) may exist within the touch region 200. The identification pattern point (4, 5, 6) may be part of the touch points within the touch region 200. One identification pattern point (4, 5, 6) or a plurality of identification pattern points (4, 5, 6) may be provided. That is, the number of identification pattern points (4, 5, 6) may be adjusted in view of the number of desired identification patterns and limitations of the apparatus 500 for forming an identification pattern for a touchscreen. The identification pattern points 4, 5 and 6 may be combined with the region forming points 1, 2 and 3 to form an identification pattern.

Referring to FIG. 5, when the touch region 200 is square, that is, a=b=10 as in FIG. 4, the touch region has a total of 100 (=10×10) touch points due to the region forming points 1, 2 and 3. To prevent an error, however, touch points on sides of the square on which the region forming points 1, 2 and 3 are located may be excluded. However, the present invention is not limited thereto, and touch points touched previously can also be allowed to be touched again.

If the touch points excluded are taken into consideration, a total of 81 (=9×9) touch points may exist in the touch region 200. Therefore, a touch on a first identification pattern point 4 can produce 81 identifiable identification patterns.

Further, since the region forming points 1, 2 and 3 are used for pattern identification, more numbers of identification patterns can be formed in the same touch region. That is, even when the first and third region forming points (1, 3) touch different points on the upper and left sides of the touch region 200, the same touch region 200 may be formed, but identification patterns formed may be different from each other. Therefore, the number of cases where the first region forming point 1 selects any one of nine touch points excluding the second region forming point 2 on an upper side may be multiplied by the number of cases where the third region forming point 3 selects any one of nine touch points excluding the second region forming point 2 on a left side. Therefore, a total of 6561 (=9×9×9×9) touch points may exist in the touch region 200.

Referring to FIG. 6, a second identification pattern point 5 may be touched after the first identification pattern point 4 is touched. Assuming that a touch point of the first identification pattern point 4 is excluded, 524880 (=9×9×81×80) identification patterns can be formed.

If a third identification pattern point 6 is touched after the first identification pattern point 4 and the second identification pattern point 5, 41465520 (=9×9×81×80×79) identification patterns can be formed.

The present invention seems not much different from the conventional multi-touch in terms of numbers. However, since the touch region 200 is formed using the region forming points 1, 2 and 3, there is no need to exclude redundant patterns. That is, the shape of a pattern cannot be moved or rotated in a generated touch region. Therefore, patterns of the same shape may be not the same pattern but different patterns if they are different in position or rotated versions of each other.

Referring back to FIG. 3, the formed identification pattern is applied, and a preset event corresponding to the identification pattern is executed (operation S320).

An identification pattern may serve as an ID of an identifiable entity. For example, the identification pattern may indicate a particular space. Therefore, the identification pattern may be an identification pattern of the place and used to identify the place. In addition, the identification pattern may indicate a particular shop or a particular person in charge instead of the place. Therefore, an identification pattern can be used to identify a place and a service provider, and a preset event corresponding to the identification pattern can be executed.

The preset event may be an action such as a command, data transmission and link up, etc. That is, when the identification pattern is applied, an action of transmitting data corresponding to the identification pattern may be performed. However, the present invention is not limited thereto.

The data may be data indicating that a user of the touchscreen 100 has been located in a place corresponding to the identification pattern. However, the present invention is not limited thereto. For example, the data may also be data indicating that the user of the touchscreen 100 has made a purchase in a shop corresponding to the identification pattern. In addition, the data may be data indicating that the user of the touchscreen 100 has received service from a service provider corresponding to the identification pattern. The data may be stored in a recording device. For example, the data may be stored and displayed on an electronic device including the touchscreen 100, such as a tablet PC or a smartphone.

If an identification pattern has a lot of identifiable entities (such as a place) as described above, the utilization of identification patterns may be increased as the number of identification patterns increases. Therefore, the method of forming an identification pattern for a touchscreen according to the current embodiment can be employed to prevent the formation of redundant patterns by touching the region forming points 1, 2 and 3 in advance and complete numerous number of identification patterns by touching the identification pattern points 4, 5 and 6.

The region forming points 1, 2 and 3 and the identification pattern points 4, 5 and 6 may be touched at different locations. That is, a touched touch point may not be touched again. However, the present invention is not limited thereto, and the region forming points 1, 2 and 3 and the identification pattern points 4, 5 and 6 can be touched at the same locations in a highly reliable device that can distinguish successive touches.

The preset event corresponding to the identification pattern can be identified by additionally using position information. For example, different events may be executed when pattern 1 is touched in Korea and in Brazil. There are no particular limitations on units in which the position information is used. The identification pattern can be limited to each identifiable position instead of country. In this way, identification patterns used to identify more entities can be formed.

Referring back to FIG. 3, it is determined whether the identification pattern is valid (operation S330). A procedure for determining whether the formation of an identification pattern is valid may be needed. For example, whether an identification pattern has been formed at a designated, valid position may be determined to prepare for the possibility of the identification pattern forming apparatus being stolen. This can also be a procedure for distinguishing identical patterns in a state where numerous places use identification patterns.

The determining of whether the identification pattern is valid may include transmitting time information or position information to a server and determining whether the identification pattern is valid using the server based on the time information or the position information.

If an identification pattern has been applied, the identification pattern forming apparatus which applied the identification pattern may transmit a time at which the identification pattern was applied to the server together with the preset event. At the same time, a touchscreen-embedded electronic device which received the identification pattern may transmit a time at which it received the identification pattern to the server. The time information transmitted from the identification pattern forming apparatus and the time information transmitted from the electronic device may be compared to determine whether the application of the identification pattern is valid.

In addition, information about a position at which the identification pattern was applied may be used. When the same pattern as the identification pattern is formed within a certain range, the position information may be used to identify the identification pattern based on the position and to determine whether the identification pattern is valid.

The position information may be information provided by all means capable of recognizing position. The position information can be obtained by, but not limited to, global positioning system (GPS), Bluetooth low energy (BLE), and WiFi fingerprint.

The time information and the position information can be used simultaneously or independently.

The server may determine whether the applied identification pattern is valid using the time information and/or the position information.

A method of forming an identification pattern for a touchscreen according to another embodiment of the present invention will now be described with reference to FIG. 7.

FIG. 7 illustrates a method of forming an identification pattern for a touchscreen according to another embodiment of the present invention.

Referring to FIG. 7, a minimum recognizable area exists in a capacitive touchscreen 100. The minimum recognizable area refers to an area recognized as a central point 400 of a touch area 300 when the touch area 300 wider than the minimum recognizable area is touched. Therefore, the number of the central points 400 existing in a touch region 200, which is 100 (=10×10) times larger than the minimum recognizable area, is far greater than the number of the central points 400 existing in the minimum recognizable area. Accordingly, the number of identifiable identification patterns may be increased according to the number of the central points 400. Therefore, the utilization of the present invention can be increased significantly.

An apparatus for forming an identification pattern for a touchscreen according to an embodiment of the present invention will now be described with reference to FIGS. 6, 8 and 9. A description of elements and features identical to those of the method of forming an identification pattern for a touchscreen according to the present invention will be given briefly or omitted.

FIG. 8 is a perspective view of an apparatus for forming an identification pattern for a touchscreen according to an embodiment of the present invention. FIG. 9 is a side view illustrating a touch action of the apparatus for forming an identification pattern for a touchscreen according to the embodiment of the present invention.

Referring to FIGS. 6 and 8, an apparatus 500 for forming an identification pattern for a touchscreen includes a handle 510, a button unit 520, a protective unit 530, a touchscreen touching unit (540a through 540c), and an electronic device connector 550.

The handle 510 is not particularly limited but may be shaped like a pole that can be held with a hand. For example, the handle 510 may be shaped like, but not limited to, a cylinder. The handle 510 may enable a user to hold the identification pattern forming apparatus 500 with a hand and press the button unit 520.

The handle 510 may be made of, for example, a conductive material. Therefore, when the handle 510 is held with a hand, static electricity from the hand may be transmitted as an electrical signal. The electrical signal may flow along the button unit 520 and the touchscreen touching unit (540a through 540c). When a capacitive touchscreen 100 is touched, the electrical signal may be transmitted to the touchscreen 100. If the touchscreen 100 is a resistive touchscreen, the apparatus 500 for forming an identification pattern for a touchscreen may transmit a physical signal instead of the electrical signal. In this case, the handle 510 does not need to be made of a conductive material. However, the present invention is not limited thereto.

In addition, even if the touchscreen 100 touched by the apparatus 500 for forming an identification pattern for a touchscreen is a capacitive touchscreen, the handle 510 may not be made of a conductive material. When the handle 510 is not made of a conductive material, the touchscreen touching unit (540a through 540c) may generate an electrical signal in other ways. Specifically, the electrical signal may be generated using an electric current of an internal battery of the apparatus 500 or an electric current of an electronic device connected to the apparatus 500. In this case, a user can hold the apparatus 500 with a gloved hand, not a bare hand.

When the apparatus 500 for forming an identification pattern for a touchscreen touches a resistive touchscreen, it may transmit a physical signal generated by pressure instead of an electrical signal. In this case, the use of the above electric currents is not necessary.

The electronic device connector 550 may connect the identification pattern forming apparatus 500 to an electronic device. The electronic device connector 550 may be a wired end which connects the identification pattern forming apparatus 500 to an electronic device. Alternatively, the electronic device connector 550 may be in the form of a separate part to be wirelessly connected using short-range wireless communication.

When the electronic device connector 550 is in a wired form, the handle 510, even if not made of a conductive material, can receive an external electric current through the electronic device connector 550. That is, an electrical signal to be transmitted to the capacitive touchscreen 100 can be generated using an electric current supplied through the electronic device connector 550. On other hand, when the electronic device connector 550 is in a wireless form, the electrical signal can be generated using an electric current generated by a battery within the identification pattern forming apparatus 500.

The button unit 520 may be pressed by pressure. The pressed button unit 520 can return to its original state due to the force of restitution. The button unit 520 may be formed integrally with the handle 510 and the touchscreen touching unit (540a through 540c) as illustrated in the drawing, but the present invention is not limited thereto. When the button unit 520 is pressed, the apparatus 500 may transmit certain data to a server or may be powered off. Since the button unit 520 is not an essential element, it can be omitted.

The touchscreen touching unit (540a through 540c) may transmit an electrical signal to the touchscreen 100 through a physical contact. The term "physical contact" does not necessarily mean touching an object. That is, even when a surface of the touchscreen 100 does not touch a surface of an object, it can be defined that a physical contact has occurred if there is an interaction between the touchscreen 100 and the object. Therefore, a contactless sensing operation such as barcode recognition or QR code recognition is defined as a physical contact. That is, an electrical and optical interaction between two objects separated by a certain distance is defined as a physical contact.

When the handle 510 is made of a conductive material, the touchscreen touching unit (540a through 540c) may transmit to the touchscreen 100 an electric signal generated using an electric current flowing from a hand or an electric current flowing through the electronic device connector 550.

Alternatively, the touchscreen touching unit (540a through 540c) may protrude in the form of a switch. In this case, when pressed through a physical contact, the touchscreen touching unit (540a through 540c) may transmit an electrical or physical signal of the apparatus 500 or an electronic device connected to the apparatus 500 to the touchscreen 100. In this way, the touchscreen touching unit (540a through 540c) can transmit a signal to the touchscreen 100 regardless of whether the touchscreen 100 is capacitive or resistive.

The touchscreen touching unit (540a through 540c) may be provided in a plurality. Three touchscreen touching units 540a through 540c are illustrated in the drawing, but the number of the touchscreen touching units 540a through 540c may be adjusted according to the number of region forming points 1, 2 and 3 and the number of identification pattern points 4, 5 and 6. That is, the number of the touchscreen touching units 540a through 540c is not particularly limited.

The touchscreen touching units 540a through 540c may first touch the region forming points 1, 2 and 3 and then the identification pattern points 4, 5 and 6. The touchscreen touching units 540a through 540c which touch the region forming points 1, 2 and 3 and the identification pattern points 4, 5 and 6 may sequentially transmit electrical and physical signals.

Various identification patterns may be formed on the touchscreen 100 by the touchscreen touching units 540a through 540c. Specifically, the region forming points 1, 2 and 3 may touched first to define a touch region, and then the identification pattern points 4, 5 and 6 may be touched. These touches may be performed by automatically and sequentially transmitting electrical signals or physical signals. The above touches may be sequentially performed at a regular time interval. The adjective "regular" in the regular time intervals is a concept encompassing a tiny time difference.

The touchscreen touching unit (540a through 540c) may be provided in a plurality. While three touchscreen touching units 540a through 540c are illustrated in the drawing, this is merely an example, and the number of the touchscreen touching units 540a through 540c is not limited to a particular number. The arrangement of the touchscreen touching units 540a through 540c may be preset. The arrangement of the touchscreen touching units 540a through 540c may be determined according to the shape of the region forming points 1, 2 and 3 and the identification pattern point 4, 5 and 6.

The region forming points 1, 2 and 3 are points for forming the touch region 200. However, the touchscreen touching units 540a through 540c for the region forming points 1, 2 and 3 may be arranged in a narrower range than the touch region 200. Specifically, the touchscreen touching units 540a through 540c may define a wider touch region 200 than the arrangement of the touchscreen touching units 540a through 540c for the region forming points 1, 2 and 3 by adjusting the region forming points 1, 2 and 3 and constraints (such as lengths of sides and a length of a radius) of a preset figure.

The protective unit 530 may cover the touchscreen touching units 540a through 540c to protect the touchscreen touching units 540a through 540c. The protective unit 530 may be made of an insulator in order to prevent an unintended electric current from flowing to the touchscreen touching units 540a through 540c.

Referring to FIG. 9, the apparatus for forming an identification pattern for a touchscreen may form an identification pattern through a physical contact with the touchscreen 100. The term "physical contact" does not necessarily mean touching an object. That is, even when a surface of the touchscreen 100 does not touch a surface of an object, it can be defined that a physical contact has occurred if there is an interaction between the touchscreen 100 and the object. Therefore, a contactless sensing operation such as barcode recognition or QR code recognition is defined as a physical contact. That is, an electrical and optical interaction between two objects separated by a certain distance is defined as a physical contact. The touchscreen 100 may be a touchscreen embedded in a smartphone 10 or a tablet PC.

An apparatus for forming an identification pattern for a touchscreen according to another embodiment of the present invention will now be described with reference to FIGS. 10 and 11. The current embodiment is identical to the previous embodiment except for a touchscreen touching unit. Therefore, a description of elements identical to those of the previous embodiment will be given briefly or omitted.

FIG. 10 is a perspective view of an apparatus for forming an identification pattern for a touchscreen according to another embodiment of the present invention. FIG. 11 is an enlarged side view illustrating, in detail, a touchscreen touching unit of FIG. 10.

Referring to FIG. 10, a touchscreen touching unit 541 may have a single surface. The single surface of the touchscreen touching unit 541 can touch each touch point.

Referring to FIG. 11, the touchscreen touching unit 541 includes a contact unit 542 and a signal transmission unit 543.

The contact unit 542 may be a part that actually touches a touchscreen 100. When the touchscreen 100 is capacitive, the contact unit 542 may be made of a material through which static electricity can flow. In this case, the contact unit 542 may not necessarily be a conductor but may be a dielectric through which static electricity flows.

The signal transmission unit 543 may be formed on the contact unit 542 to be adjacent to the contact unit 542. The signal transmission unit 543 may transmit an electrical signal or a physical signal to the contact unit 542. The signal transmission unit 543 may include a circuit which calculates positions of region forming points 1, 2 and 3 and identification pattern points 4, 5 and 6 and a touch interval. Therefore, the signal transmission unit 543 may transmit an electrical or physical signal to the calculated positions at the calculated time interval.

Accordingly, there is no need to install and arrange a plurality of touchscreen touching units 540a through 540c (see FIG. 8) according to position. Instead, the apparatus for forming an identification pattern for a touchscreen according to the present invention can apply various identification patterns using one touchscreen touching unit 541 having the single surface.

In addition, since the apparatus can apply a new pattern each time, it is advantageous in terms of manufacturing cost and diversity.

An identification pattern applied to the touchscreen 100 may be classified by country and used to identify countries. For example, if the identification pattern expresses place, even when the same identification pattern is used for different countries, different country codes may be recognized. Therefore, the same identification patterns used for different countries can be distinguished from each other. Further, the identification pattern can be combined with other types of identification patterns to generate more types of identification patterns.

The methods discussed above may be created into a computer-executable program, and implemented in a general-purpose digital computer which operates the program by using a computer-readable medium. Furthermore, the structure of data used in the methods discussed above may be recorded on a computer-readable medium through various means. The computer-readable medium may include a storage medium such as a magnetic storage medium (for example, ROM, floppy disk, hard disk, etc.) and an optical read medium (for example, CD ROM, DVD, etc.).

While the present inventive concept has been particularly shown and described with reference to exemplary embodiments thereof, it will be understood by those of ordinary skill in the art that various changes in form may be made therein without departing from the essential features of the present inventive concept. It is therefore desired that the present embodiments be considered in all respects as illustrative and not restrictive, reference being made to the appended claims rather than the foregoing description to indicate the scope of the invention.

The invention claimed is:

1. A method of forming an identification pattern for a touchscreen, the method comprising:
   (a) defining a touch region by touching, by an identification pattern forming apparatus for a touch screen, region forming points on a touchscreen according to a sequence in which the region forming points are touched;
   (b) forming an identification pattern by combining the touch region and an identification pattern point inside the touch region defined in step (a), by the identification pattern forming apparatus,
      wherein the region forming points are touched first to define the touch region, and then the identification pattern point is touched, and
      wherein the touch region defined by the region forming points is different when the same region forming points are touched in different sequence; and
   (c) applying the formed identification pattern for executing a preset event corresponding to the identification pattern or for identifying a person, place, shop, entity, or service provider.

2. The method of claim 1, wherein the region forming points are touched sequentially to define the touch region in the step (a).

3. The method of claim 1, wherein the touch region is shaped like a convex n-gon, where n is a natural number of 3 or more.

4. The method of claim 1, wherein the region forming points and the identification pattern point are touched at different locations.

5. An apparatus for forming an identification pattern for a touchscreen, the apparatus comprising:
   a handle which can be held by a user with a hand; and
   a touchscreen touching unit which is connected to the handle and transmits an electrical or physical signal to a touchscreen, wherein the touchscreen touching unit defines a touch region by touching region forming points on the touchscreen, according to a sequence in which the region forming points are touched and forms an identification pattern by combining the touch region and an identification pattern point inside the touch region,
   wherein touchscreen touching unit first touch the region forming points to define the touch region and then touch the identification pattern point, and
   wherein the touch region defined by the region forming points is different when the same region forming points are touched in different sequence, and
   wherein the formed identification pattern, when applied, identifies a corresponding event for execution or identifies a person, place, shop, entity, or service provider.

6. The apparatus of claim 5, wherein the handle is made of a conductive material, and the touchscreen touching unit transmits the electrical signal using static electricity of the hand of the user.

7. The apparatus of claim 5, further comprising a power supply unit which supplies power to the touchscreen touching unit.

8. The apparatus of claim 5, wherein the identification pattern is used to identify different places.

9. The method of claim 3, wherein the region forming point and the identification pattern point are touched at different locations.

10. The method of claim 2, wherein the region forming point and the identification pattern point are touched at different locations.

11. The method of claim 3, wherein at least three of the region forming points are not contiguous with other region forming points.

12. The apparatus of claim 5, wherein at least three of the region forming points are not contiguous with other region forming points.

13. The method of claim 1, further comprising:
   (d) executing the preset event corresponding to the identification pattern; and (e) determining whether the identification pattern is valid.

14. The method of claim 13, wherein the step (d) comprises:
   transmitting time information or position information to a server; and determining whether the identification pattern is valid using the server based on the time information or the position information.

15. The method of claim 13, wherein the preset event is to send data to the server and the touchscreen is mounted in a portable electronic device located at a service provider.

* * * * *